(12) United States Patent
Helms et al.

(10) Patent No.: US 9,083,931 B1
(45) Date of Patent: Jul. 14, 2015

(54) VISUAL DISPLAY SYSTEM FOR CUSTOMER INTERACTION

(75) Inventors: David Lee Helms, St. Petersburg, FL (US); Dale Gillis, Mooresville, NC (US)

(73) Assignee: Rockport Enterprises, LLC, Mooresville, NC (US)

( * ) Notice: Subject to any disclaimer, the term of this patent is extended or adjusted under 35 U.S.C. 154(b) by 322 days.

(21) Appl. No.: 13/401,428

(22) Filed: Feb. 21, 2012

Related U.S. Application Data (63) Continuation-in-part of application No. 12/925,532, filed on Oct. 25, 2010, now abandoned.

(51) Int. Cl.
*H04N 5/74* (2006.01)
*G06T 15/00* (2011.01)

(52) U.S. Cl.
CPC ............... *H04N 5/74* (2013.01); *G06T 15/005* (2013.01)

(58) Field of Classification Search
CPC ................................. H04N 5/74; G06T 15/005
USPC .......................................... 345/418, 419, 634
See application file for complete search history.

(56) References Cited

U.S. PATENT DOCUMENTS

2012/0206449 A1* 8/2012 Stark .............................. 345/419

* cited by examiner

*Primary Examiner* — Brent O'Hern
(74) *Attorney, Agent, or Firm* — Clements Bernard PLLC; Lawrence A. Baratta, Jr.; Christopher L. Bernard (57) ABSTRACT

Sanitary handle cover and dispenser systems and methods include a sanitary cover for shopping carts and/or other handled devices along with a corresponding dispensing system and method. In an exemplary embodiment, the sanitary handle cover includes two layers with a first layer including static polyvinyl chloride (PVC) and a second layer disposed thereon with a plurality of imprintable coupons. In use, the PVC layer may be a wrapper around a shopping cart handle providing a sanitary cover therein with the second layer optionally adhesively and removably attached to the PVC layer for a user to remove and redeem coupons on the second layer. In another exemplary embodiment, the sanitary handle cover includes a single layer of static PVC with a plurality of imprintable coupons disposed thereon.

16 Claims, 9 Drawing Sheets

VISUAL DISPLAY SYSTEM FOR CUSTOMER INTERACTION

CROSS-REFERENCE TO RELATED APPLICATION(S)

The present non-provisional patent application is a continuation-in-part of U.S. patent application Ser. No. 12/925,532 filed on Oct. 25, 2010 and entitled "KLEENGRIP SANITARY HANDLE COVER WITH REDEEMABLE COUPONS."

FIELD OF THE INVENTION

The present invention relates generally to a sanitary cover and dispenser. More particularly, the present invention relates to sanitary handle cover and dispenser systems and methods that may be used to cover a handle of a shopping cart and/or other handled devices.

BACKGROUND OF THE INVENTION

Shopping cart handles and the like become contaminated over time with a variety of unhygienic materials due to the continuous handling by multiple different people. Furthermore, diseases proliferate on such surfaces, such as the H1N1 flu virus, and the like. Also, diseases, bacteria, germs, etc. may be liquid based as well. Conventionally, hand sanitizers are being deployed along with disposable hand wipes to clean the handles and a person's hands.

BRIEF SUMMARY OF THE INVENTION

In an exemplary embodiment, a handle cover system includes a roll of sanitary covers with each of the sanitary covers including information selectively printed thereon; and a dispensing system for the roll of sanitary covers for individually dispensing a single sanitary cover from the roll. In another exemplary embodiment, a sanitary handle cover system includes a roll of sanitary covers with each of the sanitary covers including one of advertisements and coupons selectively printed thereon; and a dispensing system for the roll of sanitary covers for individually dispensing a single sanitary cover from the roll. In yet another exemplary embodiment, a system includes a roll of sanitary covers with each of the sanitary covers comprising advertisements and coupons selectively printed thereon and each of the sanitary covers separated from adjacent covers via perforations on the roll; and means for dispensing the sanitary covers to individually dispensing a single sanitary cover from the roll.

The handle cover system may further include a box receiving the roll and comprising an opening from which sanitary covers on the roll are dispensed therefrom. Each of the sanitary covers may include static polyvinyl chloride. Optionally, each of the sanitary covers further includes information printed on the static polyvinyl chloride, wherein the information includes any of coupons, advertisements, notices, and barcodes. Alternatively, each of the sanitary covers further includes a second removable layer on the static polyvinyl chloride with the second layer including information printed thereon, wherein the information comprises any of coupons, advertisements, notices, and barcodes. The handle cover system may further include a virtual display associated with the sanitary covers, wherein the virtual display is configured to convey information associated with use of the sanitary covers. The virtual display may include a fixed portion; a screen disposed to the fixed portion, wherein the fixed portion and the screen cooperatively form an image of a person; and a projector projecting video of the person on the screen to enable face and mouth movements of the person.

BRIEF DESCRIPTION OF THE DRAWINGS

The present invention is illustrated and described herein with reference to the various drawings of exemplary embodiments, in which like reference numbers denote like method steps and/or system components, respectively, and in which:

FIG. 2 is a section view showing the dispensing unit in isolation showing the fluid impermeable PVC/PAPER (or similar) layer as it is removed from the proprietary dispenser with alignment through the dispenser.

FIG. 3 is a section view of the dispensing unit containing a roll of the fluid impermeable PVC/PAPER (or similar) as layered on the central core.

FIG. 4 is a side profile view of an exemplary embodiment of the sanitary handle cover delivery system for shopping carts and/or other handled device demonstrating the center core attachment detail.

FIG. 5 is a top profile view of an exemplary embodiment of the sanitary handle cover system for shopping carts and/or other handled device demonstrating the center core attachment detail and locking mechanism.

FIG. 6 is a detailed side profile view of an exemplary embodiment of the sanitary handle cover system for shopping carts and/or other handled device as seen from the sides

DETAILED DESCRIPTION OF THE INVENTION

In various exemplary embodiments, sanitary handle cover and dispenser systems and methods include a sanitary cover for shopping carts and/or other handled devices along with a corresponding dispensing system and method. In an exemplary embodiment, the sanitary handle cover includes two layers with a first layer including static polyvinyl chloride (PVC) and a second layer disposed thereon with a plurality of imprintable coupons. In use, the PVC layer may be a wrapper around a shopping cart handle providing a sanitary cover therein with the second layer optionally adhesively and removably attached to the PVC layer for a user to remove and redeem coupons on the second layer. In another exemplary embodiment, the sanitary handle cover includes a single layer of static polyvinyl chloride (PVC) with a plurality of imprintable coupons disposed thereon. Advantageously, the sanitary handle cover and dispenser systems and methods provide a clean, sanitary gripping and pushing surface that is a barrier to germs, bacteria, etc. on the corresponding handle.

Figure 1A:
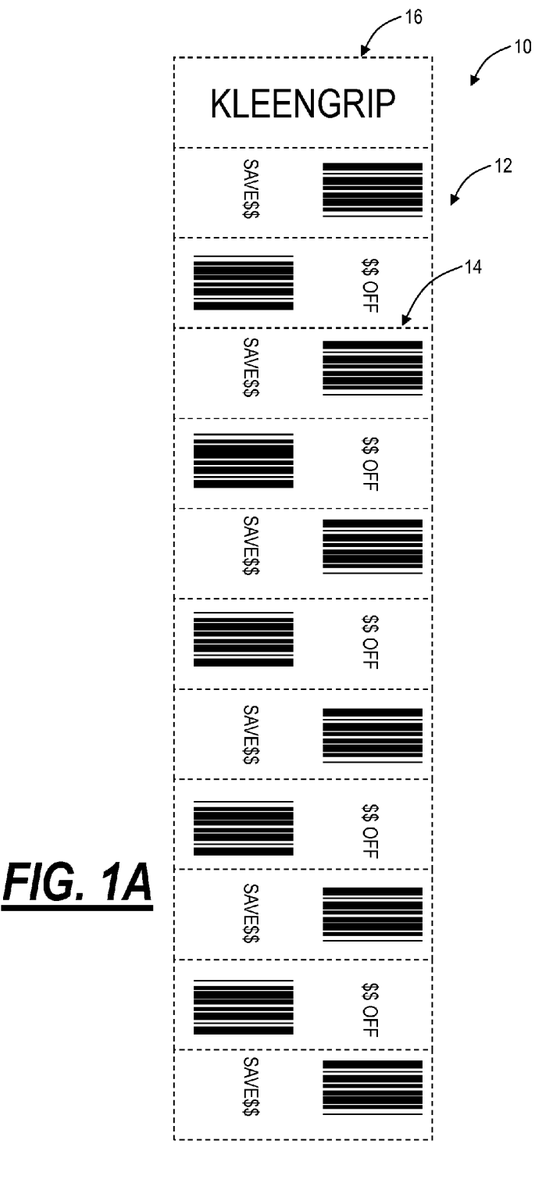
FIGS. 1A-1C are diagrams of an exemplary embodiment of a sanitary handle cover system for shopping carts and/or other handled devices.
Figure 1B:
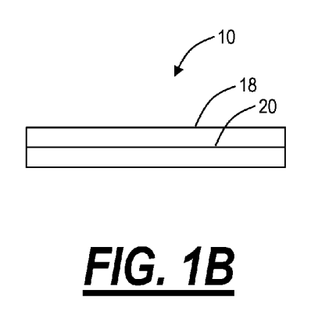
Figure 1C:
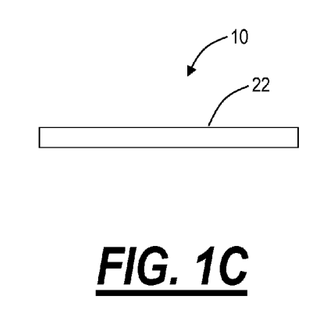

Referring to FIGS. 1A, 1B, and 1C, in an exemplary embodiment, a sanitary cover 10 is illustrated in a top view (FIG. 1A), a side view of an exemplary embodiment (FIG. 1B), and a side view of another exemplary embodiment (FIG. 1C). The sanitary cover 10 includes a substantially rectangular shape as shown in FIG. 1A. In an exemplary embodiment, the sanitary cover 10 includes an impermeable layer of PVC and/or paper (or similar) film on which a plurality of individually removable coupons 12 are disposed, imprinted, overlaid, etc. The coupons 12 may include discounts, advertisements, messages, notices, etc. The coupons 12 may further include scan-able codes such as Universal Product Code (UPC), GS1 Data bars, 2D barcodes, and the like. The coupons 12 may also further include product descriptions, discount information, photographic representation of the product, and the like. Those of ordinary skill in the art will recognize any type of information may be imprinted on the coupons 12. Each of the coupons 12 is separated from adjacent coupons 12 via perforations 14. The sanitary cover 10 may be part of a roll which includes a plurality of sanitary covers 10 with adjacent sanitary covers separated by perforations 16. In an exemplary embodiment, the perforations 16 are larger than the perforations 14 enabling ease of removal of the sanitary cover 10 from an adjacent sanitary cover 10 while not removing individual coupons 12 on the sanitary cover 10.

In an exemplary embodiment, the sanitary cover 10 may include two layers 18, 20 as illustrated in FIG. 1B. For example, the layer 20 may include an impermeable layer of PVC and/or paper (or similar) film which is configured to wrap around and contact a surface, i.e. a handle. The layer 18 may include a removable layer adhesively or the like disposed on the layer 20. Here, the layer 18 may include the coupons 12. In another exemplary embodiment, the sanitary cover 10 includes a single layer 22 as illustrated in FIG. 1C. The layer 22 may include an impermeable layer of PVC and/or paper (or similar) film configured to wrap around and contact a surface, i.e. a handle. Each of the coupons 12 may be imprinted upon the layer 22, and removable such as at a point-of-sale. Alternatively, the coupons 12 may include the scan-able codes thereby not requiring removal at the point-of-sale as they may be scanned while the sanitary cover 10 remains disposed on a handle. In an exemplary embodiment, the sanitary cover 10 may include a material that utilizes static cling.

Figure 2A:
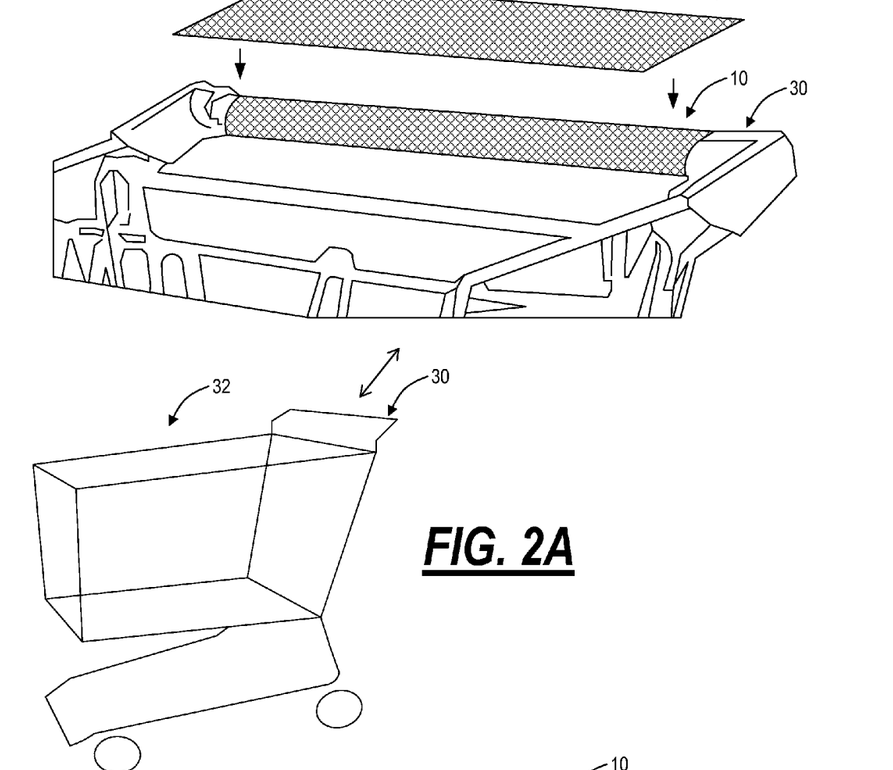
FIGS. 2A-2B are a perspective diagram of a sanitary cover being placed on a shopping cart handle and a cross sectional view of the shopping cart handle with the sanitary cover disposed thereon.
Figure 2B:
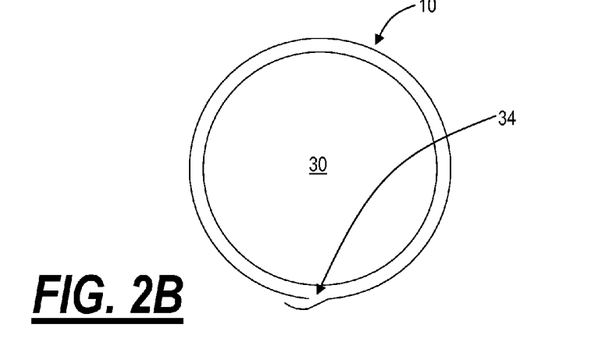
Figure 3:
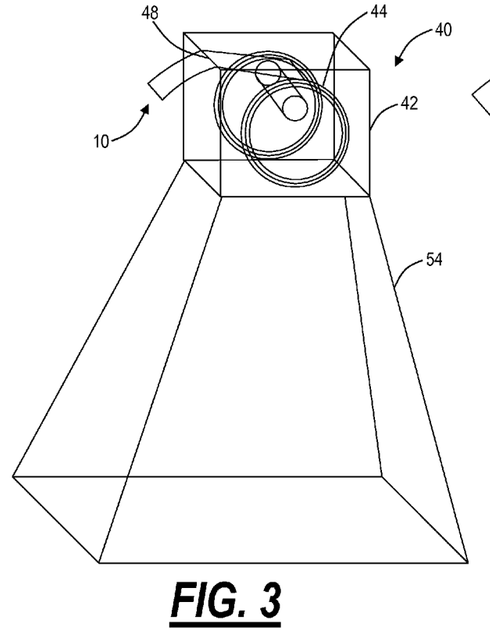
FIGS. 3-8 are diagrams of a first exemplary dispensing system for the sanitary cover.
Figure 4:
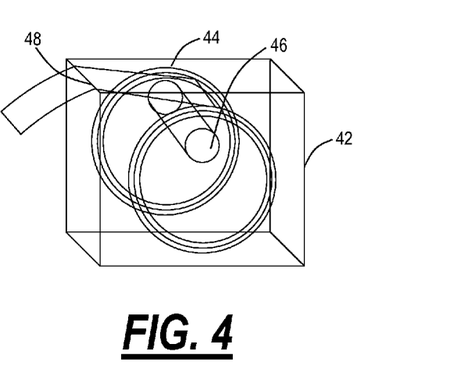
Figure 5:
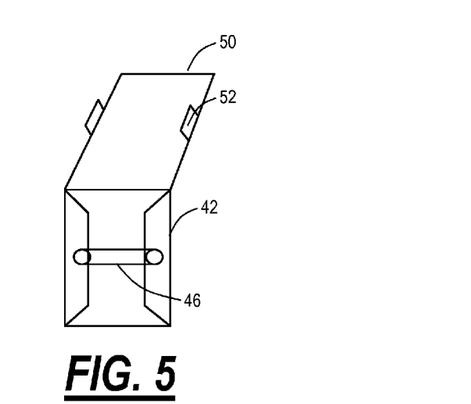
Figure 6:
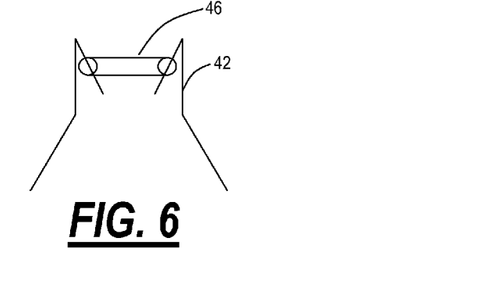
Figure 7:
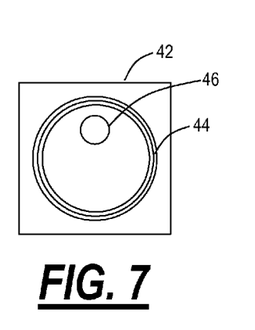
Figure 8:
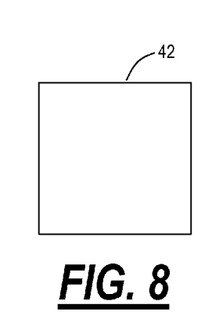
Figures 9, 10:
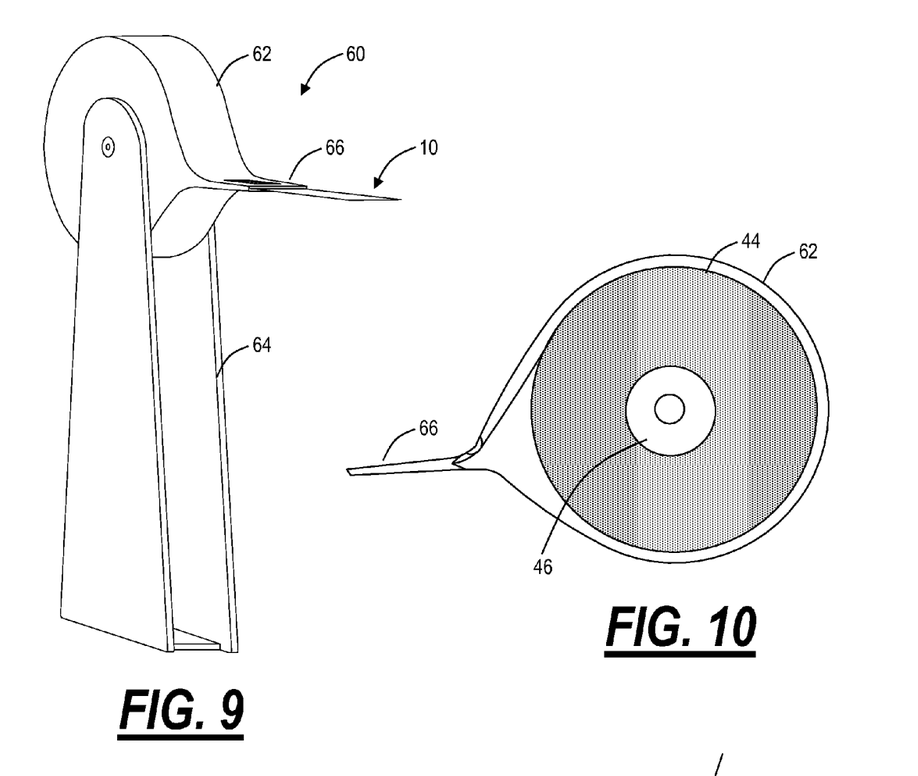
FIGS. 9-14 are diagrams of a second exemplary dispensing system for the sanitary cover.
Figure 11:
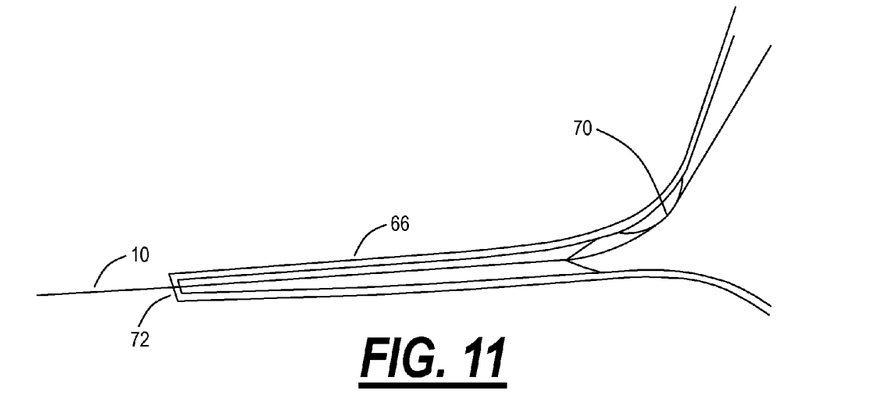
Figure 12:
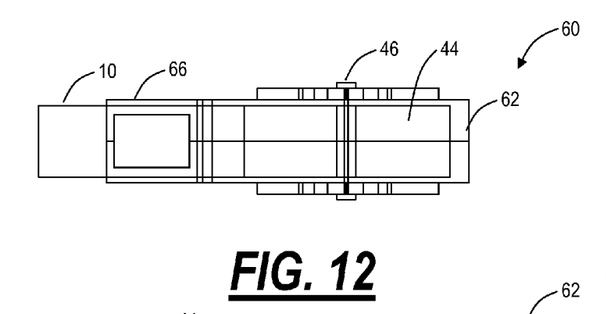
Figure 13:
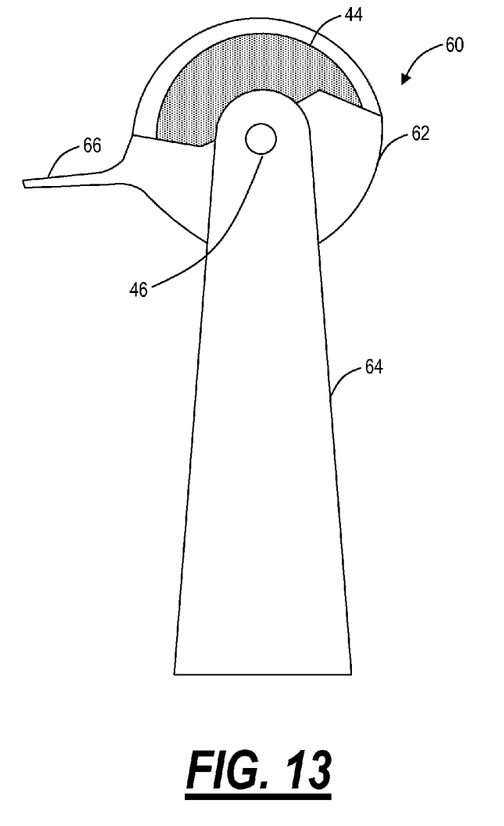
Figure 14:
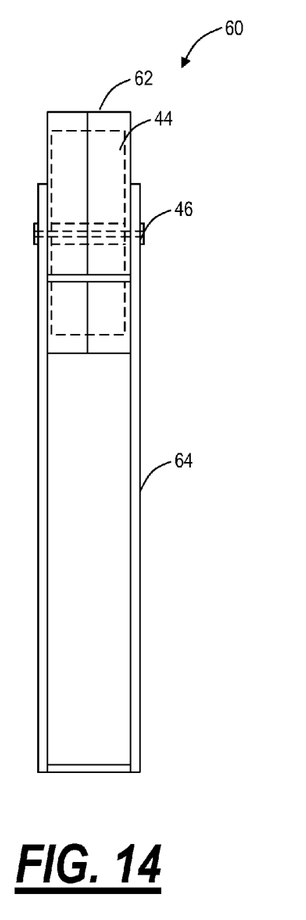

Referring to FIGS. 2A-2B, in an exemplary embodiment, the sanitary cover 10 is illustrated disposed on a handle 30 of a shopping cart 32. FIG. 2A illustrates a method of positioning the sanitary cover 10 to substantially cover the handle 30 such that the sanitary cover 10 wraps around the handle 30. FIG. 2B illustrates a cross-sectional view of the handle 30 with the sanitary cover 10 disposed thereon. The sanitary cover 10 is dimensioned to cover an entire circumference of the handle 30 and to wrap around and overlap 34 on itself. In this exemplary embodiment, the handle 30 is illustrated with a circular cross-sectional, and those of ordinary skill in the art will recognize the handle 30 may have varying geometries. Importantly, the sanitary cover 10 is dimensioned and configured to wrap around the handle 30 forming a sanitary barrier for a user to grip the handle 30 without being exposed to germs and the like than may reside on the handle 30.

Referring to FIGS. 3-8, in an exemplary embodiment, a first exemplary dispensing system 40 is illustrated for the sanitary cover 10. The dispensing system 40 includes a box 42 (FIGS. 3-8) with a roll 44 of a plurality of sanitary covers 10. The sanitary covers 10 are rolled in the roll 44 around a tube 46, and the sanitary covers 10 are dispensed through an opening 48 in the box 42. In an exemplary embodiment, the roll 44 is placed in the box 42, e.g. the box 42 may include a top 50 which may be opened for placement of the roll 44 therein. The top 50 may include tabs 52 for closure thereof. The box 42 may sit on a stand 54 to dispense the sanitary covers 10 therefrom.

Referring to FIGS. 9-14, in an exemplary embodiment, a second exemplary dispensing system 60 is illustrated for the sanitary cover 10. The dispensing system 60 includes a housing 62, a stand 64, and a dispenser 66. The roll 44 is placed/housed in the housing 62 and to dispense the covers 10 through the dispenser 66. The dispenser 66 includes a notch 70 which guides the covers 10 off the roll 44 to an opening in dispenser 66. Users may obtains a cover 10 through pulling the cover 10 out of an opening 72 in the dispenser 66 and tearing off the cover 10 at a perforation on the roll 44.

Figure 15:
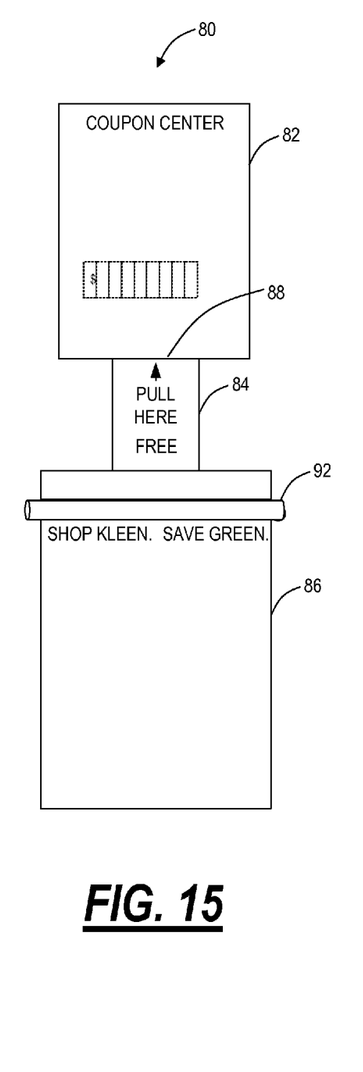
FIGS. 15-16 are diagrams of a third exemplary dispensing system for the sanitary cover.
Figure 16:
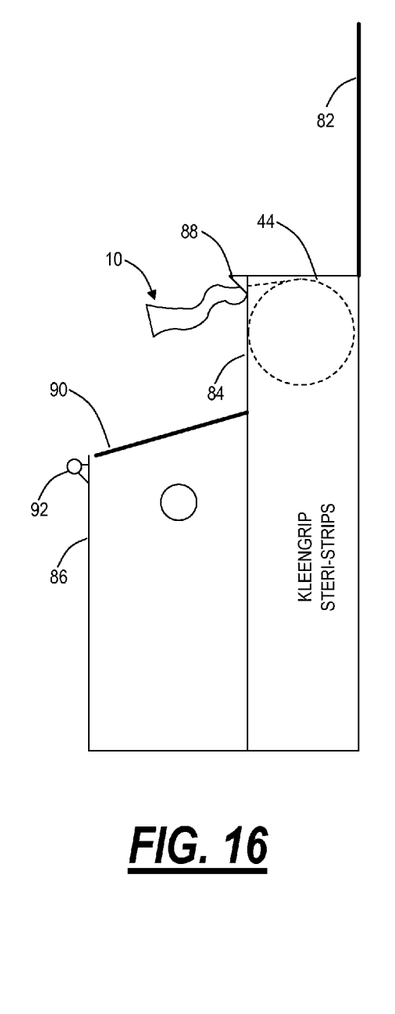

Referring to FIGS. 15-16, in an exemplary embodiment, a third exemplary dispensing system 80 is illustrated for the sanitary cover 10. FIG. 15 illustrates a front view of the dispensing system 80 and FIG. 16 illustrates a side view of the dispensing system 80. Similar to the systems 40, 60, the dispensing system 80 provides the sanitary covers 10 from the roll 44. The dispensing system 80 includes an information display section 82, a sanitary cover dispensing section 84, and a disposal section 86. The information display section 82 is utilized to advertise and provide directions for using the covers 10 on a handle. The information display section 82 explains how to apply the cover 10 and how to simultaneously use the cover 10 for coupons. Note, the information display section 82 may or may not be included with the system 80. The dispensing section 84 includes the roll 44 which provide the covers 10 through an opening 88. Finally, the disposal section 86 may include a trash can or recycling bin accessible through a tray 90. In an exemplary embodiment, the disposal section 86 includes a handle 92 upon which a cover 10 may be placed showing users the proper use of the cover 10.

Figure 17:
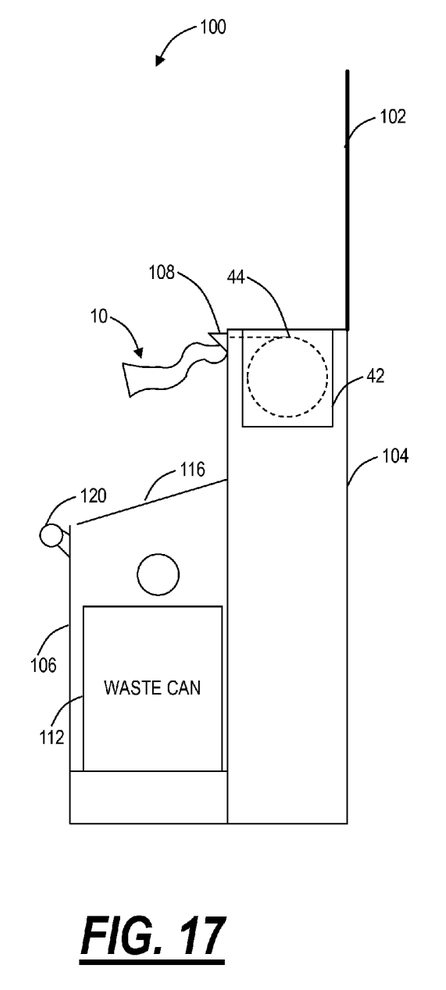
FIGS. 17-19 are diagrams of a fourth exemplary dispensing system for the sanitary cover.
Figure 18:
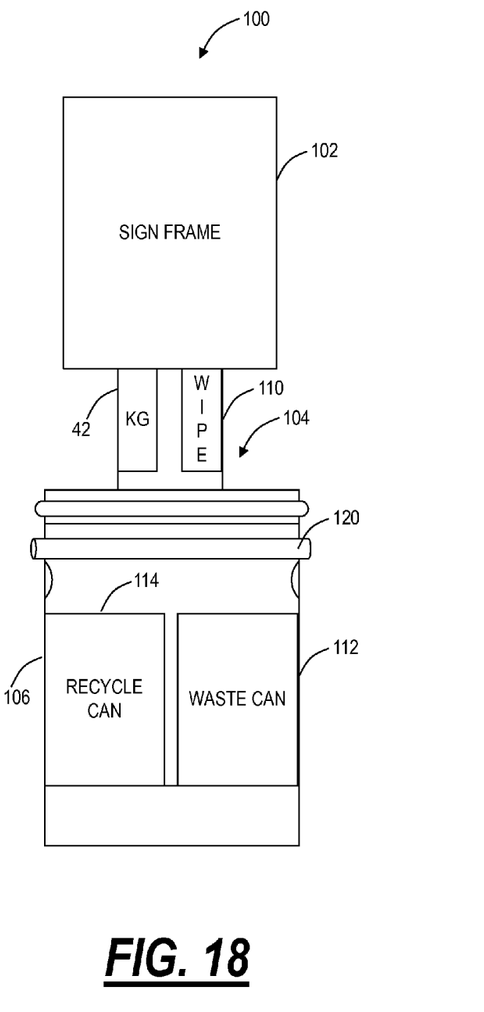
Figure 19:
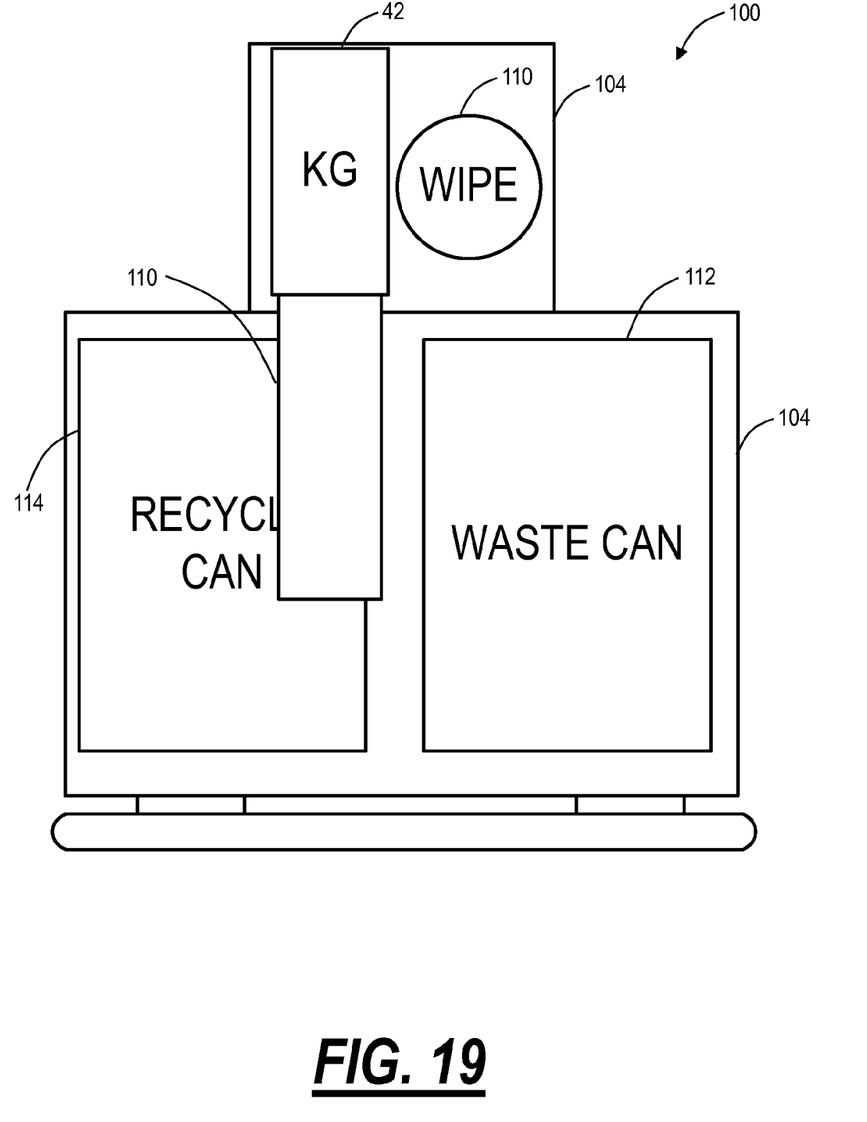

Referring to FIGS. 17-19, in an exemplary embodiment, a fourth exemplary dispensing system 100 is illustrated for the sanitary cover 10. For the dispensing system 100, FIG. 17 illustrates a side view, FIG. 18 illustrates a front view, and FIG. 19 illustrates a top view. Similar to the systems 40, 60, 80, the dispensing system 100 provides the sanitary covers 10 from the roll 44. The dispensing system 100 includes an information display section 102, a sanitary cover dispensing section 104, and a disposal section 108. The information display section 102 is utilized to advertise and provide directions for using the covers 10 on a handle. The information display section 102 explains how to apply the cover 10 and how to simultaneously use the cover 10 for coupons. Note, the information display section 102 may or may not be included with the system 100. The dispensing section 104 includes the roll 44 in the box 42 which provides the covers 10 through an opening 108. Additionally, the dispensing section 104 may also dispense wipes 110 for sanitizing and/or cleaning handles, hands, spills, etc.

Finally, the disposal section 106 may include a trash can 112 and/or recycling bin 114 accessible through a tray 116. In an exemplary embodiment, the disposal section 100 includes a handle 120 upon which a cover 10 may be placed showing users the proper use of the cover 10. The handle may also open/close the disposal section 106 for access to the trash can 112 and the recycling bin 114. For example, the tray 116 may be selectively lifted, a front portion of the disposal section 106 may grant access to the interior, etc.

The dispensing systems 40, 60, 80, 100 are expected to be physically deployed in retail environments, e.g. grocery stores, supermarkets, retail stores, warehouse clubs, etc. The rolls 44 may be provided periodically to stock/replenish the dispensing systems 40, 60, 80, 100. The content, i.e. advertisements, coupons, etc., on the sanitary covers 10 may be updated over time and different for different retailers. It is expected that the rolls 44 are provided periodically to the retailers with the appropriate and updated information.

Figure 20:
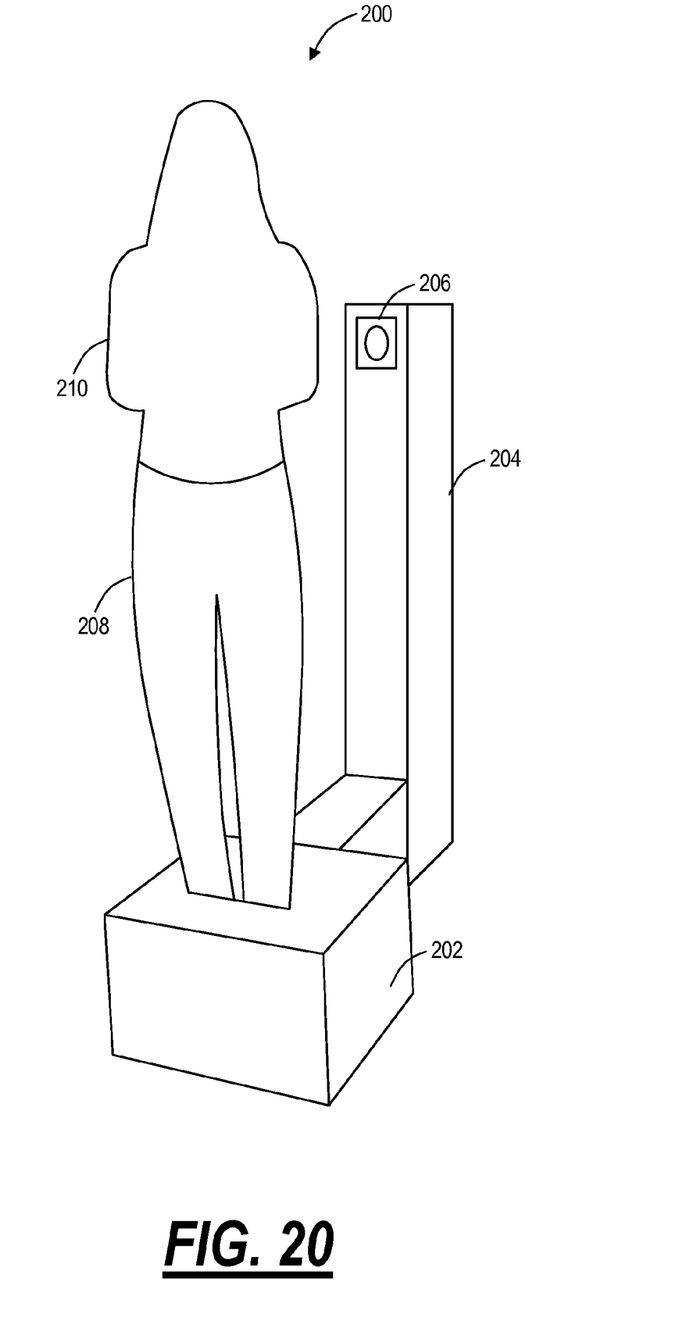
FIG. 20 is a diagram of a virtual display system for use with the dispensing systems and the sanitary handle cover system.

Referring to FIG. 20, in an exemplary embodiment, a virtual display 200 is illustrated for use with the sanitary cover 10. The virtual display 200 may be utilized coincident with or integrated within any of the dispensing systems 40, 60, 80, 100. The virtual display 200 provides users information on how to use the sanitary cover 10 including placement on the handle, detachment of the coupons, etc. The virtual display 200 may be referred to as a holographic greeter, a virtual greeter, a virtual concierge, etc.

The virtual display 200 includes a base 202, a projector stand 204, a projector 206, a fixed section 208, and a screen 210. The base 202 supports the fixed section 208 and the screen 210. The projector stand 204 extends from a rear portion of the base 202 to elevate the projector 204. The projector 204 is configured to display images on the screen 210. The fixed section 208 includes a fixed, non-animated portion of a person. That is, the person is a virtualized greeter and the fixed section 208 is a painted or printed of the person. For example, the fixed section 208 may include pants. The screen 210 may include an acrylic screen cut out in the size and shape of a top half of the person. The projector 204 is configured to project images onto the screen 210 providing a user standing in front of the display 200 a virtualized greeter with voice and facial movements. For example, a sound system may be disposed within the base 202 and/or projector stand 204 for sound to accompany the images from the projector 204.

The virtual display 200 is an exciting information, branding and promotional messaging medium which displays a holographic image projected onto a life-sized cut-out that is so unique and lifelike, consumers cannot help but stop and stare. Advertisers can deliver their message or introduce new products to a receptive audience without intimidation. The inclusion of Advanced Next Generation QR Codes in the message allows smart phone users to further engage themselves in the Advertiser's message. By using simple color coded QR Codes, the Greeter can convey any message . . . from simple contact information, reservations or directions, to in-depth web based interaction, such as discounts or special offers, further enticing patrons. This may also include Blue QR Codes which serve as interactive survey codes that the end user can scan and link directly to online customer satisfaction surveys that when completed by the end user will provide direct feedback on products, services, etc. The Surveyor can/will automatically generate coupons for discounts on future purchases as a courtesy for completion of the survey and these coupons will be emailed directly to the survey taker.

The virtual display 200 can be positioned virtually anywhere and is a high-tech communications platform that serves up in-store information, directions, personal greetings and/or branding impressions in a decidedly unique fashion. The key to branding is in unique impressions. The virtual display 200 may be used with Retailers, Museums, Hotels, Attractions, Mass Transit, Schools, Hospitals, Trade Expos, Doctors, and Offices. The virtual display 200 may be considered an employee who delivers messages 24 hours a day, seven days a week with no breaks.

In addition to the virtual display 200 incorporating Advanced Next Generation QR Codes into the Greeter's message, the virtual display 200 can engage memory and emotions through a scent delivery system, creating a total immersion experience for Retailers, Advertisers and Patrons. It has been well documented that smell can have a halo effect and put Shoppers in a positive mood, which affects their perception of a product or their environment. The sense of smell goes straight into the limbic system in the brain, which is responsible for emotions and decision-making. Brand memory and increased attention and interaction are directly influenced by this powerful emotional motivator. By engaging the Customer with the compelling image of the virtual display 200, then further immersing them on a cognitive level with a fragrance, the virtual display 200 can create an ingrained branding experience not soon forgotten. When placed at the entry of the store, it will create a lasting first impression and will be the last thing they smell and remember when leaving.

In an exemplary embodiment, the virtual display 200 can support 360 degree visibility through a film combination on the screen 210. This can support users at varying lines of site viewing the virtual display 200. The virtual display 200 can also be a close-up projection system meaning the projector 206 is close to the screen 210. Further, the virtual display 200 can be interactive with touch screen capabilities, such as built into the screen 210 or another device near or on the screen 210. The virtual display 200 can also include laser targeting capabilities.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A system comprising:
a virtual display system associated with a retail environment, wherein the virtual display system comprises:
a fixed portion coupled to a base, wherein the fixed portion is fixed, non-animated portion of a person;
a screen disposed to the fixed portion, wherein the screen is a screen cut out in a size and shape of a top half of the person, wherein the fixed portion and the screen cooperatively form a visual display of the person; and
a projector configured to project video of the person on the screen to enable face and mouth movements of the person.

2. The system of claim 1, wherein the fixed portion is painted or printed with pants for the person.

3. The system of claim 1, wherein the screen is an acrylic screen cut out in the size and shape of a top half of the person.

4. The system of claim 1, wherein the fixed portion and the screen together form a life-sized cut-out of the person.

5. The system of claim 1, wherein the virtual display system have one or more barcodes disposed therein.

6. The system of claim 1, wherein the virtual display system further comprises a scent delivery system creating a total immersion experience for Retailers, Advertisers and Patrons.

7. The system of claim 1, wherein the virtual display system further comprises a touch screen for interaction.

8. The system of claim 1, wherein the virtual display system further comprises a projector stand coupled to the based and supporting the projector, wherein the projector is configured to project the video of the person on a backside of the screen, such that the screen and the fixed portion are standing as a virtual person and such that the person is visible from 360 degrees of view through varying lines of site to the virtual display system.

9. A sanitary handle cover system comprising:
- a virtual display system associated with sanitary covers in a retail environment, wherein the virtual display system is configured to convey information associated with use of the sanitary covers, and wherein the visual display system comprises:
- a fixed portion coupled to a base, wherein the fixed portion is fixed, non-animated portion of a person;
- a screen disposed to the fixed portion, wherein the screen is a screen cut out in a size and shape of a top half of the person, wherein the fixed portion and the screen cooperatively form a visual display of the person; and
- a projector configured to project video of the person on the screen to enable face and mouth movements of the person.

10. The sanitary handle cover system of claim 9, wherein the fixed portion is painted or printed with pants for the person.

11. The sanitary handle cover system of claim 9, wherein the screen is an acrylic screen cut out in the size and shape of a top half of the person.

12. The sanitary handle cover system of claim 9, wherein the fixed portion and the screen together form a life-sized cut-out of the person.

13. The sanitary handle cover system of claim 9, wherein the virtual display system have one or more barcodes disposed therein.

14. The sanitary handle cover system of claim 9, wherein the virtual display system further comprises a scent delivery system creating a total immersion experience for Retailers, Advertisers and Patrons.

15. The sanitary handle cover system of claim 9, wherein the virtual display system further comprises a touch screen for interaction.

16. The sanitary handle cover system of claim 9, wherein the virtual display system further comprises a projector stand coupled to the based and supporting the projector, wherein the projector is configured to project the video of the person on a backside of the screen, such that the screen and the fixed portion are standing as a virtual person and such that the person is visible from 360 degrees of view.

* * * * *